Dec. 14, 1971  R. F. MANKE  3,626,596
OIL FILLER TUBE PLUG AND DIP STICK COMBINATION
Filed Jan. 15, 1970
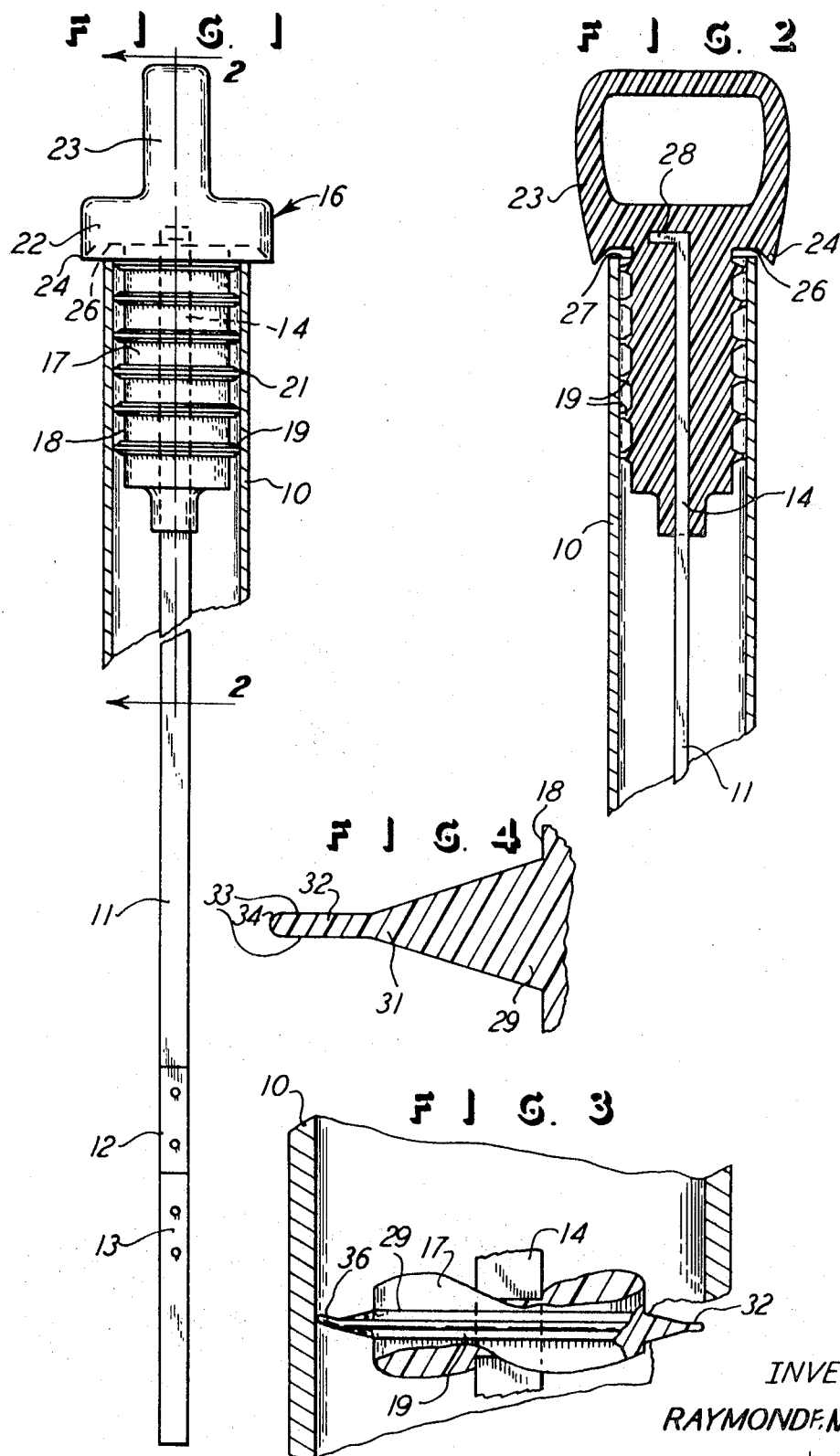
INVENTOR:
RAYMOND F. MANKE
Arthur J. Hansmann
ATTORNEY United States Patent Office 3,626,596
Patented Dec. 14, 1971

3,626,596
OIL FILLER TUBE PLUG AND DIP STICK COMBINATION
Raymond F. Manke, Racine, Wis., assignor to
J. I. Case Company, Racine, Wis.
Filed Jan. 15, 1970, Ser. No. 3,131
Int. Cl. G01f 23/04
U.S. Cl. 33—126.7 R    4 Claims

ABSTRACT OF THE DISCLOSURE

A filler tube plug with a dip stick imbedded in the plug and extending therefrom. The plug has a series of rings shown spaced therealong on a shank portion of the plug, and the dip stick extends through the shank portion to be securely imbedded therein and to also reinforce the shank portion of the plug. A handle is also an integral part of the plug, and a shoulder is formed on the plug to limit insertion of the assembly into an oil filler tube. The rings on the plug are flexible and are shown to have reduced outer ends for flexing on the wall of the filler tube when the plug is inserted and removed relative to the filler tube.

---

This invention relates to an oil filler tube plug and dip stick combination of the type used in connection with gasoline engines.

BACKGROUND OF THE INVENTION

The prior art contains examples of different embodiments of combined oil filler tube plugs and dip sticks. These plugs are commonly known to exist in rubber material, and metallic dip sticks are assembled and connected with the rubber plug for extending therefrom for the common purpose of dipping into the engine crank-case to determine the level of oil in the crank-case. The heretofore known combined plugs and dip sticks are made of many parts and are relatively intricate and complex in the shapes of the parts and in the assembly of the many parts into the final combination. Therefore, there is a problem and a concern for providing a combined plug and dip stick assembly which is simplified in its construction and assembly, but which is of an improved construction from the standpoint of reliability, accuracy in determining oil level, strength, and prevention of entry of dirt into the crank-case. Accordingly, it is a general object of this invention to provide a combined plug and dip stick which will meet the aforementioned requirements.

It will therefore be understood that in certain engines, such as those used in powering agricultural and construction tractors which are subjected to heavy duty requirements and which are commonly operating in dirty conditions, the engine oil filler tube commonly contains the dip stick so that only one opening or tube is required to extend into the engine crank-case. However, in these structures, the dip stick must be accurately positioned in the tube so that the level of oil can be accurately determined, and the entire plug and dip stick assembly must be arranged to preclude the entry of dirt into the engine crank-case and the assembly must be secure with the filler tube but yet readily removable therefrom, as desired. The prior art has commonly provided O-rings or like rubber rings which slide on the filler tube wall and which prevent the entry of some dirt and moisture into the filler tube. However, these prior art structures, as mentioned above, are known only in expensive and elaborate structures requiring many parts and complicated assemblies of parts.

The present invention provides a simplified but improved oil filler tube and plug dip stick combination which can be formed from a molded or cast plug portion with the dip stick imbedded therein and extending from the plug portion. The sealing means and the handle for the assembly are also molded right into the plug portion itself, and the dip stick is arranged to be secure with the molded plug and to reinforce the plug so that it can serve its purpose of sealing with the filler tube and of also holding the entire assembly in the filler tube.

BRIEF DESCRIPTION OF THE DRAWINGS

FIG. 1 is an elevational view of a preferred embodiment of this invention with a part thereof broken away and showing the embodiment related to a fragment of a filler tube.

FIG. 2 is a sectional view taken on the line 2—2 of FIG. 1.

FIG. 3 is an enlarged view of a fragment of FIG. 1, and with a corner thereof broken away.

FIG. 4 is an enlarged view of a fragment of FIG. 1, and showing it sectioned.

DETAILED DESCRIPTION OF THE PREFERRED EMBODIMENT

An engine oil filler tube 10 is shown sectioned in the drawings, and it will be understood that the tube extends upwardly from an engine which is not shown but which would have a crank-case and oil in the crank-case, in the conventional arrangement. A dip stick 11 extends axially of the tube 10 and would extend down into the engine crank-case. The dip stick 11 may be made of either a metal or plastic material, and it has an area designated 12 which would be marked to indicate that the oil level is "full" and it would have an area designated 13 which indicate that the oil level is "low," with the areas and markings 12 and 13 being of a conventional and well-known nature.

The dip stick 11 has an upper end 14 which extends axially of a plug generally designated 16. The plug is shown to be of a plastic material, and it could also be of a rubber or other resilient material as hereinafter will be apparent. The plug 16 includes a cylindrical shank portion 17 shown extending axially of the filler tube 10 and having an outer circumference 18 of a diameter less than the internal diameter of the tube 10. A series of annular projections or rings 19 are spaced along the shank portion 17, and the outer edges or circumferences 21 of the rings 19 are in sliding contact with the internal diameter of the tube 10.

The plug 16 also has a cap portion 22 and a handle 23, with the portions 17, 22, and 23 all being integrally molded together. Of course the rings 19 are also integral with the shank portion 17.

The cap 22 has a flange 24 which surrounds a shoulder 26 extending annularly on the cap 22, and the diameter of the shoulder 26 is the same as the outer diameter of the rings 19 and this is also the same as the overall diameter of the tube 10, as clearly seen in FIG. 2. Thus, the shoulder 26 would normally seat on the upper edge 27 of the filler tube 10, and this would limit the insertion of the plug and dip stick combination into the filler tube 10 so that the proper measurement of the oil level can be obtained. Also, the shoulder 26 serves as a seal against the entry of dirt and moisture into the filler tube 10.

It will now also be understood that the dip stick 11 is of a rigid material, and the dip stick is assembled with the plug 16 by having the latter cast or molded around the dip stick upper end 14. In this manner, the assembly is readily and inexpensively achieved, but the functional advantage is that the dip stick 11 serves as a reinforcing member for the plug shank 17 which is of a resilient material, as mentioned. Also, the dip stick terminal end 28 is off-set so that the stick is firmly secured with the plug 16 and therefore the dip stick can indicate the proper level of oil when the assembly is properly seated on the filler tube 10, as mentioned.

Particularly FIGS. 3 and 4 show the configuration of the rings 19, and it will here be seen that the rings 19 have their radially outer edges of a smaller cross-sectional size than that of the radially inner edges. Thus, FIG. 4 shows the cross-section of a ring 19 to be substantially triangularly shaped with the inner portion 29 larger than the outer portion 31, in the triangular configuration. Further, the rings 19 have the integral extension 32 which is shown to have parallel sides 33 and which terminate in a wiping edge 34, shown to be semicircular in cross-sectional shape as seen in FIG. 4. The overall relationship in the configuration of the ring 19 as seen in FIG. 4 is such that the triangular portion thereof, including the portions 29 and 31, is twice the radial dimension as that of the extension 32. This arrangement therefore means that the base portion 29 of the ring 19 is substantial in size and strength, but the outer extension portion 32 is available for flexing on the tube 10, as shown in the flexed condition designated 36 in FIG. 3. Therefore, the rings 19 physically retain the assembly in the filler tube 10, as desired, and they also seal the filler tube 10 so that dirt and moisture cannot enter the tube 10. Further, the rings 19 actually wipe the inner wall of the tube 10 when the plug 16 is withdrawn from the tube 10, so dirt and moisture is withdrawn from the tube 10 if such dirt and moisture happen to get into the tube 10 during thte time that the assembly was in the tube and the engine was being used in the conditions conducive to extreme dust and moisture.

What is claimed is:

1. In an oil filler tube plug and dip stick assembly, a dip stick for measuring the level of oil, and a plug, said plug comprising a handle for maneuvering said assembly relative to the filler tube, a shoulder for abutting the filler tube and limiting insertion of said assembly into the filler tube, and a cylindrical shank portion for insertion into the filler tube, said shank portion having ring means which includes at least one ring extending endlessly around said shank portion and with the radially outer portion of said ring being of a reduced cross-section relative to the portion thereof adjacent said shank portion for sealing with the filler tube by flexing of said radially outer portion in response to sliding of said shank into and out of said filler tube, the improvement comprising said plug and dip stick being of only a two piece assembly with said plug being of a moldable and resilient material with said one end of said dip stick having a length thereof in integral relation with said cylindrical shank portion through the latter being molded onto said length and having said length snugly encased in said cylindrical shank portion to be affixed thereto with the remainder of said stick extending therefrom along the axis of said cylindrical shank portion.

2. The subject matter of claim 1, wherein said one end of said dip stick terminates in an offset end imbedded in said shank portion for axially securing said dip stick to said plug.

3. The subject matter of claim 1, wherein there are a plurality of said integral rings spaced apart along the axial length of said shank portion, and said one end of said dip stick extends throughout the axial length of said shank portion.

4. The subject matter of claim 1, wherein all of said rings of said ring means are of a triangular cross-sectional shape, and said radially outer portion of each of said rings is an integral extension on said ring.

References Cited

UNITED STATES PATENTS

| | | | |
|---|---|---|---|
| 2,343,168 | 2/1944 | Bickle | 33—126.7 |
| 3,371,418 | 3/1968 | Moeller | 33—126.7 |
| 3,296,703 | 1/1967 | Stade et al. | 33—126.7 |

LEONARD FORMAN, Primary Examiner

C. E. PHILLIPS, Assistant Examiner